(12) United States Patent
Ji

(10) Patent No.: US 7,357,213 B2
(45) Date of Patent: Apr. 15, 2008

(54) STARTER WITH ELECTRIC OIL PUMP FOR HYBRID VEHICLE

(75) Inventor: Sang-Woo Ji, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 288 days.

(21) Appl. No.: 11/297,827

(22) Filed: Dec. 7, 2005

(65) Prior Publication Data

US 2007/0111849 A1 May 17, 2007

(30) Foreign Application Priority Data

Nov. 15, 2005 (KR) ........................ 10-2005-0109124

(51) Int. Cl.
*B60K 1/00* (2006.01)

(52) U.S. Cl. .................... 180/305; 180/65.2; 180/65.1; 180/65.4; 180/205; 180/65.6

(58) Field of Classification Search ................ 180/305, 180/65.2, 65.1, 65.4, 205, 65.6
See application file for complete search history.

(56) References Cited

U.S. PATENT DOCUMENTS

| | | | |
|---|---|---|---|
| 5,846,155 A | * | 12/1998 | Taniguchi et al. ............. 477/2 |
| 6,524,217 B1 | * | 2/2003 | Murakami et al. ............. 477/5 |
| 6,736,753 B2 | * | 5/2004 | Endo et al. .................... 477/3 |
| 2001/0008192 A1 | * | 7/2001 | Morisawa ................... 180/197 |

FOREIGN PATENT DOCUMENTS

| | | |
|---|---|---|
| JP | 09-158962 | 6/1997 |
| JP | 10-169485 | 6/1998 |
| JP | 2004-156774 | 6/2004 |

* cited by examiner

*Primary Examiner*—Christopher P. Ellis
*Assistant Examiner*—Cynthia F. Collado
(74) *Attorney, Agent, or Firm*—Peter F. Corless; Edwards Angell Palmer & Dodge LLP

(57) ABSTRACT

The present invention provides a hybrid vehicle, which has both the function of supplying hydraulic oil to a transmission when the idle operation of an engine is stopped, and the function of providing start force when the engine is cold started, thus reducing space occupied by components, and enhancing assembling productivity due to modularized components.

4 Claims, 2 Drawing Sheets

STARTER WITH ELECTRIC OIL PUMP FOR HYBRID VEHICLE

CROSS-REFERENCE TO RELATED APPLICATIONS

The present application is based on, and claims priority from, Korean Application Serial Number 10-2005-0109124, filed on Nov. 15, 2005, the disclosure of which is hereby incorporated by reference herein in its entirety.

FIELD OF THE INVENTION

The present invention relates to a starter with an electric oil pump for a hybrid vehicle and, more particularly, to a starter with an electric oil pump for a hybrid vehicle, constructed to supply hydraulic oil to a transmission when an engine is started.

BACKGROUND OF THE INVENTION

A conventional hybrid vehicle is constructed so that an engine and an electric motor are operated in conjunction with an auxiliary machine, respectively. Further, the hybrid vehicle is provided with a starter motor to start the engine, and an electric oil pump to supply hydraulic oil to a transmission.

In such a vehicle, the electric motor is referred to as an Integrated Starter Generator (ISG), and has both a starting function and an electricity generating function. The starter motor serves to forcibly rotate a crank shaft when the engine is started. The electric oil pump provides hydraulic oil to the transmission, in addition to a path which supplies hydraulic oil to the transmission by the driving of the engine when the idle operation of the engine is stopped.

However, the conventional hybrid vehicle constructed as described above is problematic in that it must be provided with the starter motor which moves the crank shaft when the engine is started, and the electric oil pump which supplies hydraulic oil to the transmission, respectively, so that a large installation space is required, and the starter motor and the electric oil pump must be separately assembled, thus inconveniencing a manufacturer.

SUMMARY OF THE INVENTION

Embodiments of the present invention provide a hybrid vehicle, which has both the function of supplying hydraulic oil to a transmission when the idle operation of an engine is stopped, and the function of providing start force when the engine is cold started, thus reducing space occupied by components, and enhancing assembling productivity due to modularized components.

A hybrid vehicle according to an embodiment of the present invention includes an engine to generate a driving force by combustion of fuel. An auxiliary machine is operated by the driving force generated during the operation of the engine. An integrated starter generator starts the engine using electric power charged when the engine is hot started, produces electric power using the driving force of the engine, and drives the auxiliary machine using the charged electric power when the engine stops idle operation. A belt operates a pulley installed at each of a crank shaft of the engine, an output shaft of the auxiliary machine, and an output shaft of the integrated starter generator. A clutch is installed on the crank shaft, and controls power transmission between the crank shaft and the pulley installed at the crank shaft. An automatic transmission shifts and outputs a driving force generated from the engine according to driving conditions. A starter motor generates a driving force by charged electricity when the engine is cold started, thus starting the engine. An electric oil pump supplies hydraulic oil to the automatic transmission. In this case, the starter motor includes a drive part, a selective engaging part, and an engagement drive part. The drive part is rotated when operating power is applied. The selective engaging part has a pinion which is movably installed on a rotating shaft of the drive part, and engages with a ring gear which is coupled to the crank shaft of the engine, during start. The engagement drive part operates the selective engaging part only when the engine is started, thus forcing the pinion to engage with the ring gear. The electric oil pump shares a single rotating shaft with the starter motor.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Herein below, a preferred embodiment of the present invention will be described in detail with reference to the accompanying drawings.

Figure 1:
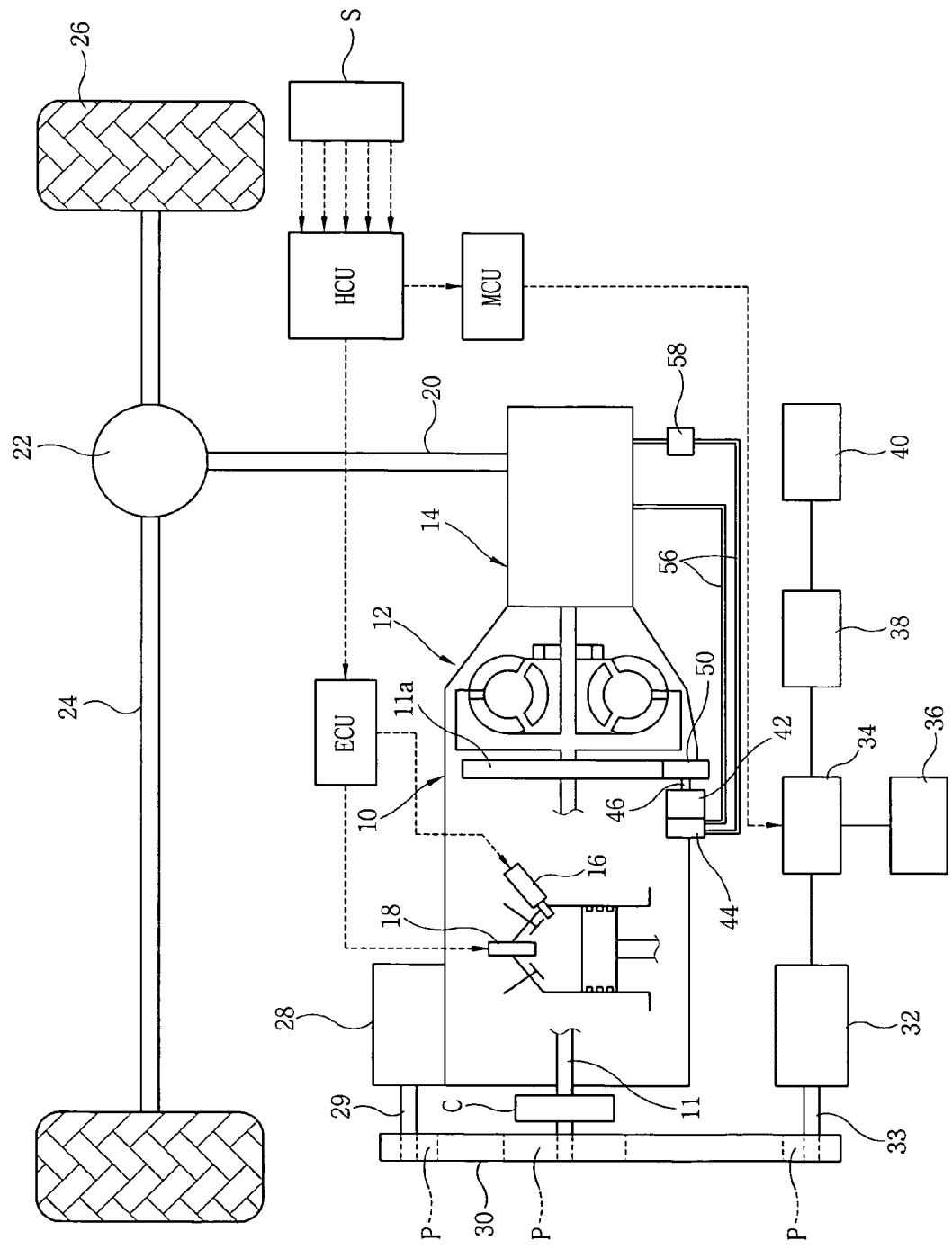
FIG. 1 illustrates the construction of a hybrid vehicle having a starter with an electric oil pump, according to the present invention.
Figure 2:
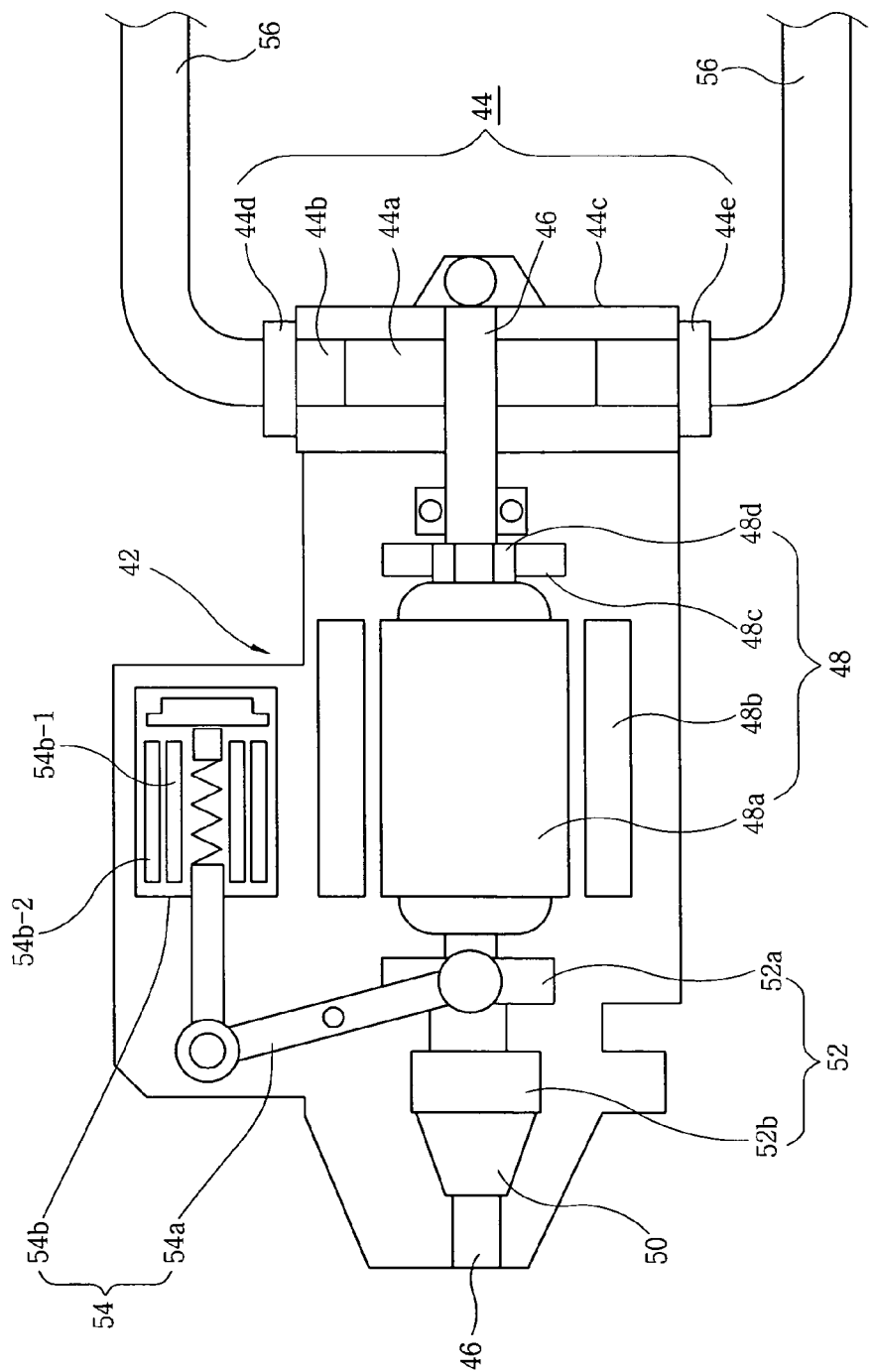
FIG. 2 depicts the detailed construction of the starter with the electric oil pump shown in FIG. 1.

As shown in FIGS. 1 and 2, a vehicle includes an engine 10, a torque converter 12, and an automatic transmission 14. The engine 10 is a power source of the vehicle, and burns an air/fuel mixture, thus generating a driving force. The torque converter 12 amplifies the driving force generated by the engine 10. The automatic transmission 14 automatically changes the reduction ratio between the maximum reduction ratio and the minimum reduction ratio.

The engine 10 is provided with an injector 16 which regulates an amount of fuel injection and a fuel injection period. In the case of an ignition engine, the engine 10 is provided with an ignition plug 18. The injector 16 and the ignition plug 18 are operated under the control of an Engine Control Unit (ECU).

Further, the engine 10 rotates an input shaft of the torque converter 12 via a crank shaft 11. An output shaft of the torque converter 12 rotates an input shaft of the automatic transmission 14. An output shaft of the automatic transmission 14 rotates a propeller shaft 20. Thereby, wheels 26 are rotated through a differential gear 22 and an axle 24.

The crank shaft 11 of the engine 10 is coupled via a belt 30 to an auxiliary machine 28, such as a power steering oil pump, a compressor for an air conditioner, and a water pump, thus transmitting power to the auxiliary machine 28. An ISG 32 is coupled to the auxiliary machine 28 to generate a driving force using electricity which is charged in a battery to transmit power when the idle operation of the engine 10 has stopped.

In this case, the ISG 32 provides start force when the engine 10 is hot started, and provides driving force to the auxiliary machine 28 in place of the engine 10 when the idle operation of the engine 10 has stopped.

To this end, a pulley P is installed on each of the crank shaft 11 of the engine 10, the output shaft of the auxiliary machine 28, and an output shaft 33 of the ISG 32 so that they are operated in conjunction with each other via the belt 30. Further, a clutch C is installed on the crank shaft 11 to control power transmitted between the crank shaft 11 and the pulley P provided on the crank shaft 11. The clutch C comprises an electronic or hydraulic multiple disc clutch, the engagement and disengagement of which are controlled by the ECU that will be described below in detail.

Further, the ISG 32 is connected to a large-capacity 36V battery 36 via an inverter 34. A DC/DC converter 38 is installed between the inverter 34 and the large-capacity battery 36. The DC/DC converter 38 is connected to a small-capacity 12V battery 40.

In this case, under the control of a motor control unit (MCU), the inverter 34 supplies electricity required to drive the ISG 32 from the large-capacity battery 36, and in addition, supplies electric power generated by the ISG 32 to the large-capacity battery 36, thus charging the large-capacity battery 36.

Further, the DC/DC converter 38 decreases the voltage of power which is produced by the ISG 32, thus charging the small-capacity battery 40. When necessary, the DC/DC converter 38 boosts the voltage of power charged in the small-capacity battery 40, thus providing the boosted power to the ISG 32.

The ECU and the MCU are controlled by a hybrid control unit (HCU). Thus, the HCU is connected to a sensing means S which detects and inputs various operation states of the vehicle. The sensing means S comprises various kinds of sensors, which detect the speed, acceleration, and braking extent of a vehicle, the inclination of a road surface, a battery charging state, etc.

Meanwhile, the engine 10 is provided with a starter motor 42 which starts the engine 10 when the engine 10 is cold started. Further, the engine 10 is provided with an electric oil pump 44 which supplies hydraulic oil to the automatic transmission 14, when the idle operation of the engine 10 is stopped.

In this case, the starter motor 42 and the electric oil pump 44 are integrated into a single structure which shares a single rotating shaft 46. In other words, they constitute an integrated starter having the electric oil pump.

To this end, the starter motor 42 includes a drive part 48, a selective engaging part 52, and an engagement drive part 54. The drive part 48 is rotated as operating power is applied. The selective engaging part 52 is provided with a pinion 50 which is movably mounted on the rotating shaft 46 of the drive part 48, and selectively engages with a ring gear 11a mounted to the crank shaft 11 of the engine 10 during a start. The engagement drive part 54 operates the selective engaging part 52 only when the engine 10 is started, so that the pinion 50 engages with the ring gear 11a.

In this case, the drive part 48 includes a rotor 48a, a stator 48b, a brush 48c, and a rectifier 48c. The rotor 48a is installed on the rotating shaft 46. The stator 48b, comprising a permanent magnet, is disposed around the rotor 48a. The brush 48c supplies direct power to the rotor 48a. The rectifier 48d intermittently supplies direct power from the brush 48c to the rotor 48a.

The selective engaging part 52 includes a plunger 52a and an overrunning clutch 52b. The plunger 52a axially moves the pinion 50 on the rotating shaft 46. The overrunning clutch 52b restrictively transmits the driving force from the rotating shaft 46 to the pinion 50.

Further, the engagement drive part 54 includes a lever 54a and a solenoid actuator 54b. The lever 54a axially moves the plunger 52a relative to the rotating shaft 46. The solenoid actuator 54b applies actuating force to the lever 54a. A pull-in coil 54b-1 and a hold-in coil 54b-2 are wound around the solenoid actuator 54b to provide electromagnetic force.

An internal gear 44a constituting the electric oil pump 44 is secured to an end of the rotating shaft 46, and a external gear 44b is installed around the internal gear 44a in such a way as to be eccentric to the internal gear 44a. The internal gear 44a and the external gear 44b are accommodated in a housing 44c having a predetermined sealed space therein. An inlet port 44d and an outlet port 44e are formed in the housing 44c to permit the suction and discharge of the hydraulic oil.

Moreover, the inlet port 44d and the outlet port 44e are coupled via corresponding hydraulic pipes 56 to an oil fan of the automatic transmission 14. A strainer 58 is installed on the hydraulic pipe 56 to remove impurities contained in the hydraulic oil.

The operation of the present invention will be described below in detail.

First, when the engine 10 is cold started, the starter motor 42 is operated, thus driving the ring gear 11a. At this time, the crank shaft 11 of the engine 10 is operated, thus driving the auxiliary machine 28 via the belt 30. In this case, the clutch C is engaged.

Subsequently, when the engine 10 has been started and normal driving is performed, the ECU appropriately operates the engine 10 according to a driver's intentions or the driving conditions.

Meanwhile, if the sensing means S connected to the HCU determines that the idle operation of the engine 10 is stopped during the drive of a vehicle, the HCU controls the ECU, thus stopping the supply of fuel through the injector 16. Thereby, the engine 10 is stopped.

In this case, the standard of determination regarding the stop of the idle operation of the engine 10 is as follows. That is, the present charging state of the battery must exceed a preset value (about 55%), the temperature of coolant must exceed a preset value (about 70° C.), the acceleration pedal must not be pressed, a vehicle speed must be 8 km/hr or less, the brake must be being operated, and the current gear must be a drive gear.

That is, when the HCU determines that all of the above-mentioned conditions are satisfied, the injection of fuel through the injector 16 is stopped, so that the engine 10 is switched into a stop mode. Thus, if the injection of fuel through the injector 16 is stopped when the engine 10 stops idle operation, the unnecessary use of fuel is prevented, so that fuel consumption efficiency is enhanced.

At this time, the HCU controls the MCU, thus driving the ISG 32. As the ISG 32 is driven, power is generated. The power is applied to the auxiliary machine 28, so that normal operation is executed. In this case, the clutch C is disengaged, thus limiting the rotation of the crank shaft 11 due to the drive of the ISG 32.

In addition, the HCU operates the drive part 48 of the starter motor 42, thus driving the electric oil pump 44 which shares the rotating shaft 46 with the starter motor 42. Thereby, the electric oil pump 44 continuously supplies hydraulic oil to the automatic transmission 14, and prepares for the re-start of the engine 10. At this time, the engagement drive part 54 of the starter motor 42 is not operated, so that the ring gear 11a is not started despite the drive of the starter motor 42.

Further, when the sensing means S connected to the HCU determines that the engine 10 is re-started, the HCU operates the ISG 32, and starts the crank shaft 11 of the engine 10 via the belt 30. At this time, since the hydraulic oil is sufficiently supplied to the automatic transmission 14 due to the driving of the electric oil pump 44, the automatic transmission 14 can be smoothly operated. In this case, the engagement drive part 54 of the starter motor 42 is not operated, so that the ring gear 11a is not started by the driving of the starter motor 42.

Moreover, when the engine 10 is re-started, the driving of the electric oil pump 44 is conducted only at an initial starting point. When the engine 10 is normally operated, the electric oil pump 44 is not driven but a mechanical pump provided in the automatic transmission 14 is operated, thus supplying the hydraulic oil.

Meanwhile, when the engine 10 is cold started, operating power is applied to the engagement drive part 54 of the electric oil pump 44. Thereby, the selective engaging part 52 of the electric oil pump 44 is operated, so that the pinion 50 drives the ring gear 11a, thus starting the engine 10.

In this case, the electric oil pump 44 which shares the rotating shaft 46 with the starter motor 42 allows the hydraulic oil to be smoothly supplied to the automatic transmission 14.

As apparent from the foregoing, the present invention provides a starter with an electric oil pump for a hybrid vehicle, which drives an auxiliary machine and prevents the injection of fuel through an integrated starter generator, when the idle operation of an engine is stopped during the driving of the vehicle, thus increasing fuel consumption efficiency, and which is constructed so that the electric oil pump is operated due to driving of the starter motor that shares a rotating shaft with the electric oil pump, thus smoothly supplying hydraulic oil to an automatic transmission.

If the engine is re-started, that is, hot started, the start of the engine is promoted by the integrated starter generator. Conversely, if the engine is cold started, the engine is started by the driving of a ring gear due to the driving of the starter motor.

What is claimed is:

1. A starter with an electric oil pump for a hybrid vehicle, the hybrid vehicle comprising:
    an engine to generate a driving force by combustion of fuel;
    an auxiliary machine operated by the driving force generated during the operation of the engine;
    an integrated starter generator starting the engine using electric power charged when the engine is hot started, producing electric power using the driving force of the engine, and driving the auxiliary machine using the charged electric power when the engine stops idle operation;
    a belt to operate a pulley installed at each of a crank shaft of the engine, an output shaft of the auxiliary machine, and an output shaft of the integrated starter generator;
    a clutch installed on the crank shaft, and controlling power transmission between the crank shaft and the pulley installed at the crank shaft;
    an automatic transmission to shift and output a driving force generated from the engine according to driving conditions;
    a starter motor to generate a driving force by charged electricity when the engine is cold started, thus starting the engine; and
    an electric oil pump to supply hydraulic oil to the automatic transmission, wherein
    said starter motor comprises:
        a drive part rotated when operating power is applied;
        a selective engaging part having a pinion which is movably installed on a rotating shaft of the drive part, and engaging with a ring gear which is coupled to the crank shaft of the engine, during start; and
        an engagement drive part to operate the selective engaging part only when the engine is started, thus forcing the pinion to engage with the ring gear; and
    said electric oil pump shares a single rotating shaft with the starter motor.

2. The starter as defined in claim 1, wherein said electric oil pump comprises:
    an internal gear installed on the rotating shaft;
    a external gear contacting the internal gear in such a way as to be eccentric to the internal gear; and
    a housing defining a sealed space to accommodate the internal gear and the external gear therein, and having an inlet port and an outlet port to permit suction and discharge of the hydraulic oil.

3. The starter as defined in claim 2, wherein each of the inlet port and the outlet port communicates with the automatic transmission via a hydraulic pipe.

4. The starter as defined in claim 3, wherein a strainer is installed on the hydraulic pipe to remove impurities.

* * * * *